(12) United States Patent
Sturgill et al.

(10) Patent No.: US 9,367,888 B2
(45) Date of Patent: Jun. 14, 2016

(54) FEATURE RESOLUTIONS SENSITIVITY FOR COUNTERFEIT DETERMINATIONS

(75) Inventors: Malgorzata M. Sturgill, Fort Collins, CO (US); Steven J. Simske, Fort Collins, CO (US); Jason S. Aronoff, Fort Collins, CO (US); Marie Vans, Fort Collins, CO (US); Paul S. Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 72 days.

(21) Appl. No.: 14/347,307

(22) PCT Filed: Jan. 20, 2012

(86) PCT No.: PCT/US2012/022120
§ 371 (c)(1),
(2), (4) Date: Mar. 26, 2014

(87) PCT Pub. No.: WO2013/109290
PCT Pub. Date: Jul. 25, 2013

(65) Prior Publication Data
US 2015/0302542 A1    Oct. 22, 2015

(51) Int. Cl.
*G06K 9/00* (2006.01)
*G06T 1/00* (2006.01)

(52) U.S. Cl.
CPC ....... *G06T 1/0028* (2013.01); *G06T 2201/0201* (2013.01)

(58) Field of Classification Search
CPC ............... G06T 1/0028; G06T 2201/0201
See application file for complete search history.

(56) References Cited

U.S. PATENT DOCUMENTS

| | | | |
|---|---|---|---|
| 5,909,503 A | 6/1999 | Graves et al. | |
| 6,553,136 B1* | 4/2003 | Keshet | G06K 9/4609 382/135 |
| 7,924,315 B2 | 4/2011 | Kanamori et al. | |
| 2002/0012444 A1* | 1/2002 | Nishikawa | G07D 7/002 382/100 |
| 2003/0048487 A1 | 3/2003 | Johnston et al. | |
| 2004/0090641 A1* | 5/2004 | Namikata | G06K 9/6202 358/1.9 |
| 2004/0213448 A1 | 10/2004 | Jou et al. | |
| 2007/0223791 A1 | 9/2007 | Shinzaki | |
| 2008/0101663 A1* | 5/2008 | Lo | G06K 9/001 382/124 |
| 2008/0199044 A1* | 8/2008 | Tsurumi | G06T 7/2033 382/103 |
| 2009/0067724 A1* | 3/2009 | Hirohata | G03G 21/046 382/190 |
| 2009/0322875 A1 | 12/2009 | Toyoshima | |
| 2010/0104170 A1 | 4/2010 | Joshi et al. | |
| 2010/0172555 A1 | 7/2010 | Hasezawa et al. | |
| 2010/0303333 A1* | 12/2010 | Nireki | G07F 7/04 382/135 |
| 2013/0121539 A1* | 5/2013 | Liang | G07D 7/2058 382/112 |

FOREIGN PATENT DOCUMENTS

| | | |
|---|---|---|
| CN | 101420520 | 4/2009 |
| KR | 10-2010-0137989 A | 12/2010 |
| TW | 200822752 | 5/2008 |

* cited by examiner

*Primary Examiner* — Bhavesh Mehta
*Assistant Examiner* — Ian Lemieux
(74) *Attorney, Agent, or Firm* — Rathe Lindenbaum LLP (57) ABSTRACT

A counterfeit identification performance attribute (CIPA) sensitivity to changes in resolution of the image for features of an image is determined (102). The CIPA sensitivity for the features is used to choose at least one feature to determine whether the image on a sample is a counterfeit (106).

20 Claims, 9 Drawing Sheets

FEATURE RESOLUTIONS SENSITIVITY FOR COUNTERFEIT DETERMINATIONS

BACKGROUND

Counterfeiting has become a serious problem for both safety and economic reasons. Counterfeits are sometimes identified by digitally capturing sample images of labels and comparing such captured images to corresponding authentic images. The capturing of such sample images and the comparisons used by existing techniques consume large amounts of processing power, transmission bandwidth and memory. The fact that such sample images may be captured by a myriad of different types of devices having different resolutions may exacerbate this problem.

DETAILED DESCRIPTION OF THE EXAMPLE EMBODIMENTS

Figure 1:
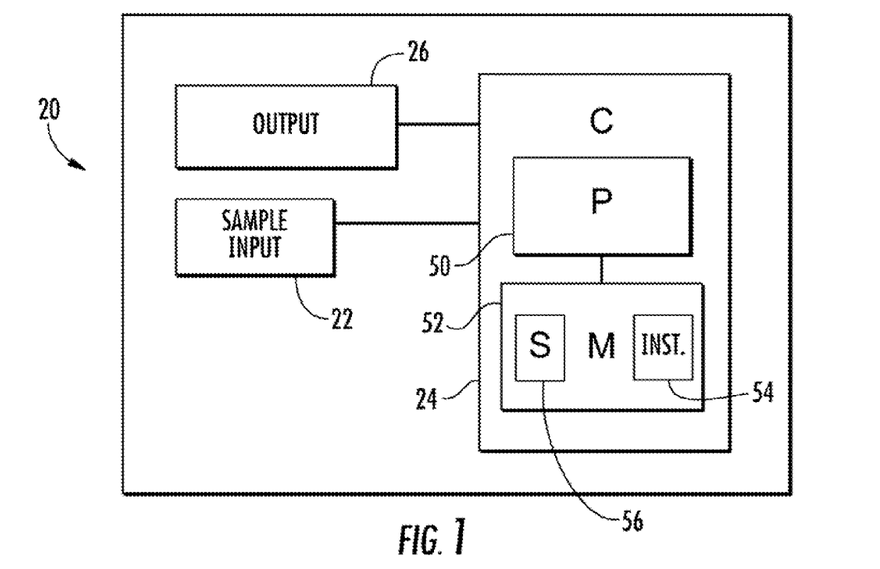
FIG. 1 is a schematic illustration of a counterfeit identification system according to one example.

FIG. 1 schematically illustrates a counterfeit identification system 20 according to one example. As will be described hereafter, counterfeit identification system 20 determines image feature resolution responsiveness or sensitivity and uses this determined sensitivity to identify what image features of an image should be used in counterfeit analysis. In one implementation, counterfeit identification system 20 determines what features of an image may be used for counterfeit analysis when a particular device having a particular resolution is used to capture the image. Counterfeit identification system 20 comprises sample input 22, computing device 24 and output 26.

Sample input 22 comprises a device to provide computing device 24 with digitally captured depictions of samples for which counterfeit identification or determination is desired. According to one example, sample input 22 comprises a digital capture device, such as a digital camera, scanner or other similar device. According to another example, sample input 22 may comprise a communication port, a memory device receiving slot or other data receiving interface to allow computing device 24 to receive such digitally captured depictions of samples.

Figure 2:
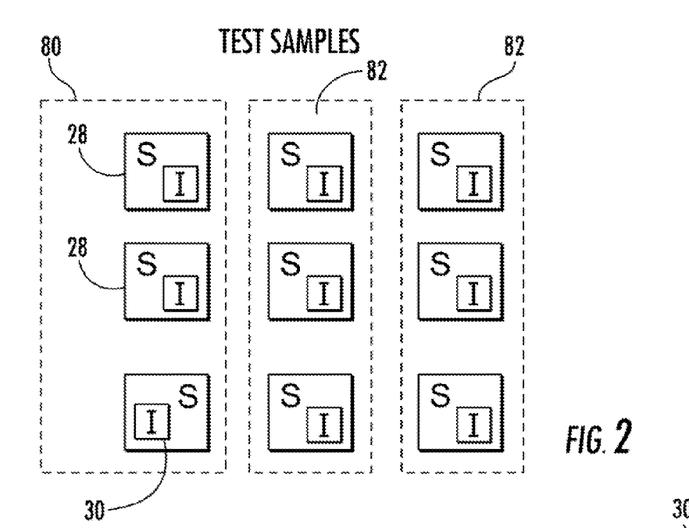
FIG. 2 is a schematic illustration of multiple samples having images using counterfeit determinations.
Figure 3:
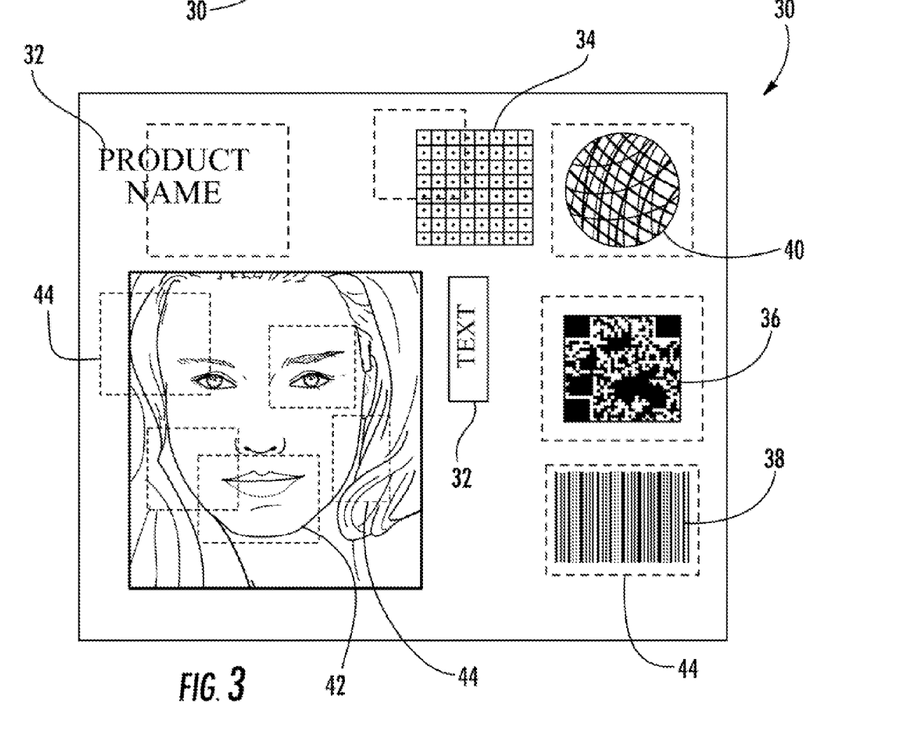
FIG. 3 is an enlarged view of an image on each of the samples shown in FIG. 2.

FIG. 2 illustrates examples of samples 28 from which images 30 may be digitally captured and subsequently provided to computing device 24 by sample input 22. FIG. 3 illustrates one example image 30 found on each of samples 28. In one example, image 30 comprises a label adhered to or printed upon the sample product 28. Although images 30 and samples 28 may appear identical to the naked eye, images 30 on some of products or samples 28 may constitute counterfeits. Counterfeit identification system 20 identifies those samples 28 having counterfeit or non-authentic images 30 based upon a quality or characteristic of the digital depiction of at least portions of image 30.

As shown by FIG. 3, each image 30 may include multiple different items which may be used for counterfeit identification. In the example illustrated, image 30 includes areas of text 32, spot colors 34, a two-dimensional barcode 36, a one-dimensional black-and-white barcode 38, a circular guilloche 40 and a graphic 42 (the portrait of a person in the example). In other implementations, image 30 may include other types of marks that may be used for counterfeit analysis. The entire area of image 30 includes multiple portions or regions 44, examples of which are enclosed by broken lines. A region 44 may encompass an entire individual item, may encompass a portion of an item, such as a portion of graphic 42, or multiple items. Each of regions 44 may have the same size (the portion of the area of image 30) or may have different sizes. Different regions 44 may partially overlap. For purposes of this disclosure, the term "image" may refer to an entirety of an image, such as the entire image 30, or a portion of the image, such as a region 44.

Image 30 and each of its regions 44 comprise multiple characteristics or features that may be used in counterfeit determinations. Examples of features or metrics that may be used to identify a counterfeit sample 28 from an authentic sample 28 or to cluster or aggregate samples 28 include, but are not limited to: R (red) channel, G (green) channel, B (blue) Channel, Cyan=(G+B−R+255)/3 channel, Magenta=(R+B−G=255)/3 channel, Yellow=(R+G−B+255)/3 channel, Hue, Saturation=max (RGB)*(1−min(RGB)/sum (RGB)), Intensity=(R+G+B)/3 and pixel variance ("edge space"), the latter which can be, in one simple implementation, defined as the mean difference (in intensity) between a pixel and its four diagonally closest neighboring pixels. In addition, histogram metrics, such as Mean, Entropy. StdDev (standard deviation), Variance, Kurtosis, Pearson Skew, Moment Skew, 5% Point (value indexing histogram below which 5% of histogram light), 95% Point (value indexing histogram below which 95% of these lay) and 5% to 95% Span, may be used. Projection profile metrics which may be used include Entropy, StdDev, Delta StdDev, Mean, Mean Longest Run, Kurtosis, Skew, Moment Skew, Delta Kurtosis, Delta Pearson Skew, Delta Moment Skew. Lines Per Inch, Graininess, Pct (percentage) In Peak, Delta Mean. For the "Delta" metrics, the difference between consecutive profiles of the projection data are used as the primary statistics. In addition, other kinds of features may be used. Anything that is calculated from an image may be used. Anything deduced from an image analysis (for example is a specific mark present or not, providing a binary feature[yes/no]) may be used as a feature Computing device 24 identifies or selects what image features of an image should be used in counterfeit analysis. In the example shown, computing device 24 further utilizes a selected feature of the image at an appropriate resolution to determine whether a subsequently received digital depiction of the image from a different sample is a counterfeit. Computing device 24 comprises processing unit 50 and persistent storage device or memory 52.

Processing unit 50 executes series of instructions 54 contained in memories 52. Memories 52 comprise computer-readable-mediums, meaning non-transitory tangible mediums. Memories 52 contain instructions 54. Memories 52 may additionally store data, such as counterfeit analysis thresholds or settings, digital depictions of captured images, prior counterfeit analysis and prior counterfeit results in a data storage portion 56 of memory 52.

Figure 4:
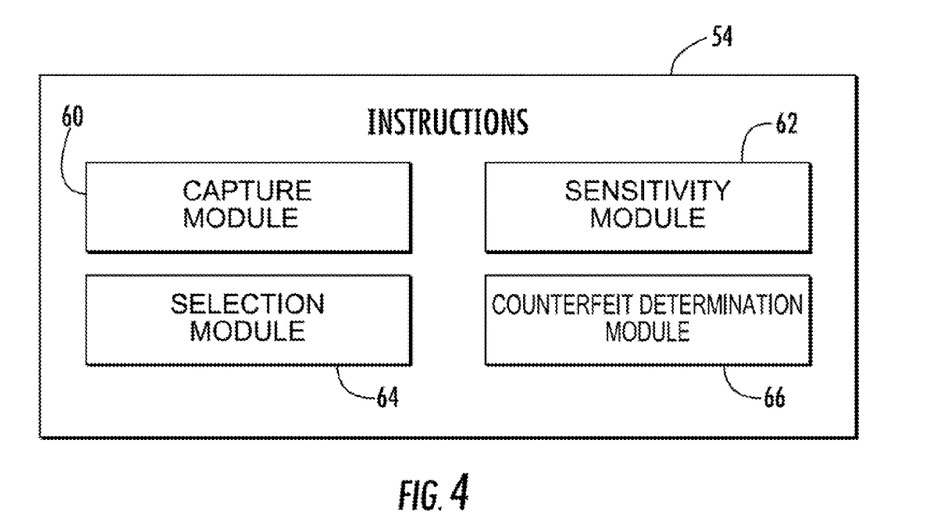
FIG. 4 is schematic illustration of counterfeit identification instructions of a computer readable medium of the system of FIG. 1.

FIG. 4 is a block diagram illustrating the various sections or modules forming the instruction portion 54 of memories 52. As shown by FIG. 4, the instructions contained in memories 52 comprise capture module 60, sensitivity module 62, selection module 64 and counterfeit determination module 66. Capture module 60, sensitivity module 62, selection module 64 and counterfeit determination module 66 direct processing units 50 to carry out method 100 shown in FIG. 5.

Capture module 60 of instructions 54 directs processing unit 50 to obtain digitally captured depictions of regions 44 (shown in FIG. 3) at a first resolution. According to one example, capture module 60 directs processing units 50 to control a digital capture device to capture the digital depictions of regions 44 at the first resolution. In one example, the entire image 30 is initially captured, wherein a particular region 44 is cropped from the image 30. In another example, the particular region 44 is initially captured without the remaining areas of image 30. According to another example, capture module 60 requests and obtains digital depictions of regions 44 at the first resolution from another memory. In yet another implementation, the entire image 30 is captured and utilized for counterfeit analysis.

Figure 5:
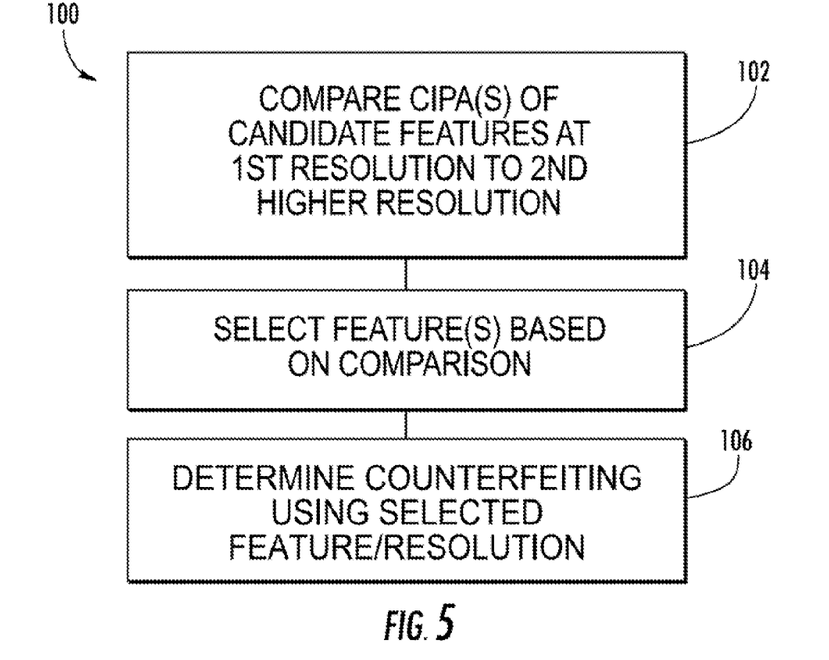
FIG. 5 is a flow diagram of an example method for selecting an image feature for counterfeit analysis.

Sensitivity module 62 of instructions 54 directs processing unit 50 to carry out step 102 of method 100 shown in FIG. 5. In particular, sensitivity module 62 compares and correlates at least one counterfeit identification performance attribute (CIPA) of each of a plurality of candidate image features captured at the first resolution to the same CIPA of the same feature of the same image or region captured at a second resolution higher than the first resolution. In other words, sensitivity module 62 determines whether counterfeit identification performance for an image feature drops off significantly when a lower resolution of the image or region is used as compared to when a higher resolution of the same image or region is used.

Examples of counterfeit identification performance attributes include, but are not limited to, counterfeit identification accuracy, clustering accuracy and clustering behavior. Counterfeit identification accuracy refers to how well analysis of a particular feature using a predetermined set of criteria performs at identifying actual counterfeit images 30 while avoiding false positives-incorrectly identifying authentic images 30 as counterfeits. In some circumstances, no training data or ground truth may be available. In such circumstances, a predictive approach may be taken. Under the predictive approach, historical data is used to identify particular image features, such as image entropy, variance, uniformity of the FFT coefficients across a given range and the like, the statistics of which (mean, variance, skew, kurtosis, range, etc.) historically provide counterfeit accuracy. Sensitivity module 62 compares and identifies features of an image or region 44 captured at the first resolution which have a CIPA that best matches or correlates to the CIPA for the same features of the image or region 44 captured at the second higher resolution.

Clustering accuracy refers to how well analysis of a particular region 44 using a particular feature performs at grouping images 30 derived from the same source. Such clustering analysis identifies those samples 28 which are suspected to originate from the same source. Such clustering (aggregating of related images) identifies sets of samples that should be examined in greater detail and may be used to determine the relative size of each potential counterfeit source. As a result, system 20 identifies those samples 28 or groups of samples 28 which likely originated from larger counterfeiting operations, allowing counterfeit enforcement resources to be better focused on larger counterfeiters.

By way of example shown in FIG. 2, the test samples 28 may include a first group 80 of samples 28 which are pre-identified as being authentic (the "ground truth"), a second group 82 of samples 28 pre-identified as being counterfeit and originating from a first source, and a third group 84 of samples 28 pre-identified as being counterfeit and originating from a second source. Clustering (and in this case also "classification") accuracy refers to how well analysis of a particular region 44 using a predetermined set of criteria performs at correctly grouping images 30 in each of group 80, 82 and 84 together. Examples of techniques that may be used to aggregate or cluster the images 30 of samples 28 using at least one of the below noted metrics or image features from region 44 of each of images 30 include, but are not limited to, k-means clustering and k-nearest neighbor classification after clustering.

Clustering behavior refers to how closely the clustering or aggregation of images 30 using a particular feature or group of features of a particular image or region 44 at the first resolution using a predetermined set of criteria matches the clustering or aggregation of the same images using the same feature or group of features of the same image or region at the second resolution. By way of the example shown in FIG. 2, clustering behavior refers to the similarity between the groupings of samples 28 (or their images 30) resulting from the use of a particular feature or groups of features from an image or region at the first resolution and the grouping of samples 28 (or their images 30) resulting from the use of the same feature or group of features of the same image or region at the second resolution.

By way of another example, at a high resolution, a group of 50 samples of the same image or region may grouped or aggregated with 10 being identified as counterfeit and 40 be identified as authentic using a feature or group of features. At a lower resolution, a group of 50 samples of the same image or region may aggregated with 15 being identified as counterfeit and 35 being identified as authentic. Using a different feature, the group of 50 samples of the same image or region at the high-resolution in the group are aggregated with 11 being identified as counterfeit and 39 being identified as authentic. At the lower resolution, the group of samples may be aggregated with 12 being identified as counterfeit and 38 being identified as authentic. In such a scenario, even without ground truthing, the second feature exhibits better clustering behavior in that the clustering, grouping or aggregating of samples is more consistent at the different resolutions. As noted, determining cluster behavior may be performed (relatively) without ground truth or training data (samples pre-identified as belonging to the same group or originating from the same source).

In some implementations, the effectiveness or metrics of a CIPA are normalized for comparison. The effectiveness, grade or metric of a CIPA using a feature at a high resolution is set to a normalized value (for example, 1, 10, 100 etc.), wherein the normalized score for the same CIPA using the same feature at a lower resolution is set as a ratio of low resolution metric/the high resolution metric. For example, using a feature of an image capture that a high-resolution may yield 80% accuracy, whereas using the same feature of the same image captured at a low resolution may yield 60% accuracy. The feature would be assigned a normalized score of 0.75 on a normalized scale of 1.0 (0.6/0.8). As a result, the sensitivities of different CIPA's resolution changes may be more directly compared.

Selection module 64 of instructions 54 (shown in FIG. 4) utilizes the results of sensitivity module 62 to operate in one of two alternative selectable modes. In a first mode of operation, selection module 64 directs controller 24 to determine a minimum resolution of an image that may be used for counterfeit analysis when a particular feature or a particular set of features are used in the analysis. In particular, selection module 64 determines the lowest resolution for an image at which values for a feature or set of features of the image sufficiently correspond to values for the same feature or the same set of features of the image at a higher resolution. In other words, selection module 64 uses the determined feature sensitivity to image resolution to identify the lowest image resolution that may be used with a feature set of features without significantly impacting the results of the counterfeit analysis. By identifying the lowest resolution of an image that produces acceptable counterfeit analysis results when a particular feature or a particular set of features of the image is used, system 20 identities what particular electronic devices (cell phone cameras, digital cameras and the like) have sufficient image resolution capabilities for capturing image samples for such counterfeit analysis.

In a second mode of operation, selection module 64 of instructions 54 directs processing unit 50 to focus on a particular image resolution capability of a particular electronic device or a particular set of electronic devices while determining what features of an image captured by the particular electronic capture device or set of electronic capture devices should be used for counterfeit analysis. A particular electronic capture device may comprise a particular camera, a particular scanner and the like. For example, system 20 may identify what feature or set of features should be used for counterfeit analysis when the images taken by a particular type of cell phone or smart phone camera. A particular set of electronic capture devices may comprise a general category or type of electronic capture device. For example, system 20 may identify what feature or set of features should be used when the images are produced by a desktop scanner or what feature set of features should be used when the images are produced or acquired by a smart phone camera.

Selection module 64 determines which feature or features of an image at the resolution of the particular electronic device or set of electronic devices have values that sufficiently correspond to values for the same feature or the same set of features of the image at a higher resolution. In other words, selection module 64 uses the determined feature responsiveness or sensitivity to image resolution to produce a list of features that may be used for counterfeit analysis when a particular electronic device or set of electronic devices is utilized. By knowing what electronic capture device produced a sample image, system 20 may then later utilize those features contained in the approved list to produce more satisfactory counterfeit analysis results.

In particular, sensitivity module 62 determines feature sensitivity to image resolution. In other words, sensitivity module 62 determines whether or how a change in the resolution of the image will impact or effect values for a single feature or multiple features of the image. In one example implementation, such sensitivity may be indicated by a percentage of values from a given test set for a feature of an image at a lower resolution that fall within a range of values for the feature of the image at a higher, base resolution (i.e. a "normalized effectiveness in which the high resolution metric is set to 1.0 and the low resolution is a ratio of (low res metric)/(high res metric). In one implementation, system 20 determines, for each of multiple lower resolutions less than the base resolution, a percentage of values that fall within the range of values for the featured image at the higher, base resolution. By determining feature resolution sensitivity across multiple different resolutions less than the base resolution, system 20 facilitates comparison of features at different test resolutions to facilitate the identification of a minimum or lower resolution that may be supported by use of a particular feature or set of features for counterfeit analysis. In addition, by determining feature resolution sensitivity across multiple resolutions around a default or nominal resolution of a particular electronic capture device, system 20 may identify image features for use in counterfeit analysis which may be less susceptible to errors as the effective resolution of the particular electronic capture device varies from the nominal resolution due to the distance of the electronic capture device from the sample, aging of sensors and or other causes for resolution variation.

In other implementations, such sensitivity may be indicated in other fashions. For example, such sensitivity may be alternatively indicated by a statistical value derived from the values for a feature of an image at a lower resolution and how the statistical value compares to the same statistical value for the feature of the image at a higher, base resolution. In one implementation, system 20 may not only determine how sensitive values for an image feature are to a change from a higher, base resolution to a lower test resolution, but may also determine how sensitive values for image feature are to changes from one lower test resolution to another lower test resolution. In one implementation, feature resolution sensitivity may be indicated by the proximity of a mean of values for the feature of an image at a lower resolution to a mean of values for the feature of the image at a higher resolution, and how this proximity changes in response to changes in the lower image resolution. In other implementations, other statistical values may be employed for indicating sensitivity.

Counterfeit determination module 66 (shown in FIG. 4) directs processing unit 50 to later determine whether a sample 28 from the general population constitutes a counterfeit based upon an analysis of the image 30 using a feature and/or resolution determined by sensitivity module 62 in step 104. Counterfeit determination module 66 carries out step 106 of method 100 shown in FIG. 5. For example, if the source of the sample 28 is known, counterfeit determination module 66 performs such counterfeit analysis using a specific set of features selected by selection module 64. If the source or device is unknown, counterfeit determination module 66 determines an effective resolution of the image of the received sample and utilizes those features that support a resolution at or above the effective resolution of the received sample.

The results of the counterfeit determinations are then presented by computing system 24 using output 26 shown in FIG. 1. Output 26 comprises a device to report the counterfeit determinations. In one example, output 26 may comprise a monitor or display screen. In another example, output 26 may comprise a printing device. In still other examples, other output mechanisms or devices may be utilized to provide the counterfeit determination results such as whether or not a particular sample 28 is a counterfeit or whether or not a particular counterfeit sample originated from a source from which other counterfeit samples originated.

Figure 5A:
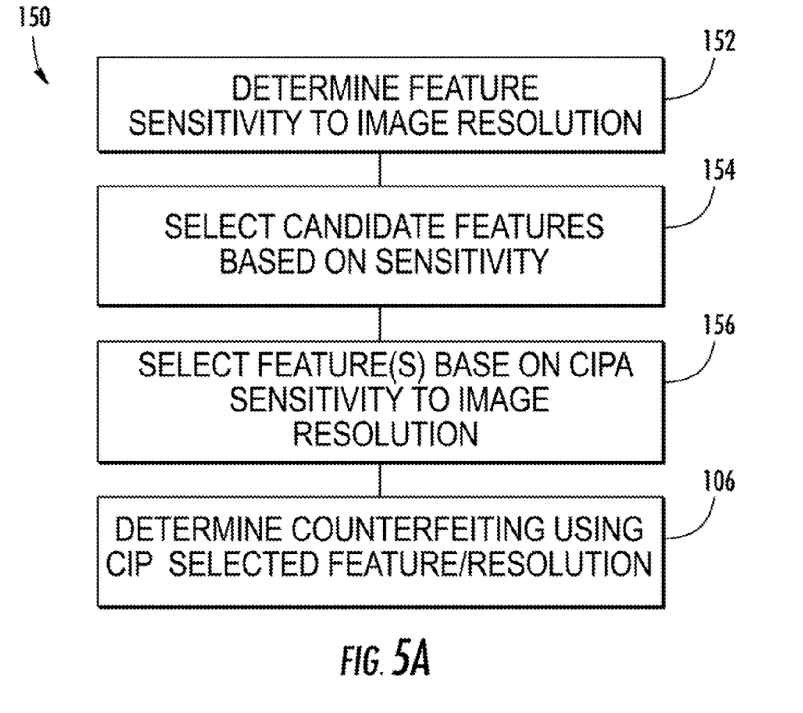
FIG. 5A is a flow diagram of another example method for selecting image features for counterfeit analysis.

FIG. 5A illustrates method 150, another example method that may be carried out by system 20 for selecting features to be used when determining counterfeiting. Method 150 is similar to method 100 except that method 150 carries out a pre-filtering operation upon candidate features prior to evaluating CIPA sensitivity of various features to image resolution. As a result, processing time and power may be saved by initially reducing a number of the available candidate features that undergo CIPA evaluation at different resolutions.

As indicated by step 152, sensitivity module 62 (shown in FIG. 4) directs processor 50 to determine the sensitivity of each of a plurality of candidates to changes in the resolution of the image from which the features are being extracted. In particular, sensitivity module 62 directs processor 50 to determine how much, if at all, the values for a particular metric or feature change in response to a change in the resolution of the image. For example, for a particular set of image samples captured at a first resolution, a feature, such as R (red) channel, may have a first value or first range of values. For the same set of image samples captured at a second resolution lower than the first resolution, the same feature may have a second value or second range of values. A large difference between the first value or range of values and the second value or second range of values would indicate that a particular feature is very sensitive to image resolution. In contrast, a small difference or no difference between the first value or range of values and the second value or second range of values would indicate that a particular feature is somewhat insensitive to image resolution.

As indicated by step 154, selection module 64 directs processor 50 to filter out or filter out those features which are sensitive to image resolution changes. In one implementation, selection module 64 may cause those features having a sensitivity greater than a predefined threshold to be no longer considered as features for determining counterfeiting using lower resolutions. For example, if it is determined that values for a particular feature at a higher base resolution substantially change to a degree above a predefined threshold when taken from an image captured at a lower resolution (the resolution being looked at which is provided by a candidate capture device), the particular feature may be removed from a list of potential candidates that are to be subsequently evaluated in step 156.

Once the universe of available features have been narrowed down based upon feature value sensitivity to image resolution per step 152 and 154, the remaining set of available candidate features are evaluated based upon CIPA sensitivity to image resolution in step 156 and as described above with respect to step 102 and step 104. Finally, as indicated by step 106, counterfeit determination module 66 uses the selected features to determine whether image samples are counterfeits.

Figure 6:
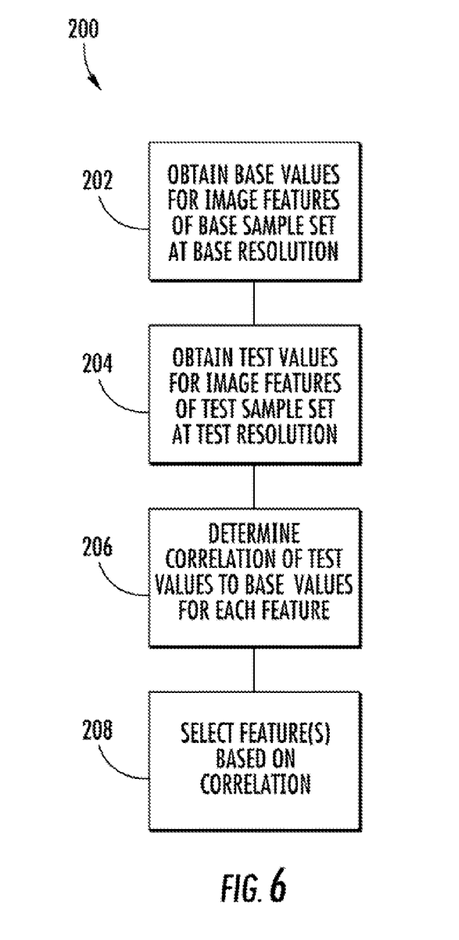
FIG. 6 is a flow diagram of another example method for selecting an image feature for counterfeit analysis based upon feature resolution sensitivity.

FIG. 6 illustrates an example method 200 that may be employed by system 20 when carrying out the feature value sensitivity to image resolution described above in FIG. 5A with respect to step 152 and 154. As indicated by step 202 and illustrated by FIG. 7, capture module 60 (shown in FIG. 4) directs processing unit 50 (shown in FIG. 1) to receive or obtain a base sample set 220 of samples 222 of an image 224 at a higher base resolution 226. The higher base resolution 226 is a resolution for the image 224 at which adequate or acceptable counterfeit detection results are obtained. This base resolution 226 is a resolution that is generally higher than the nominal resolution indicated for the particular electronic capture device of interest. In one implementation, the base resolution is a resolution of at least 600 pixels per inch (PPI). In other implementations, the base resolution may have other values.

Figure 7:
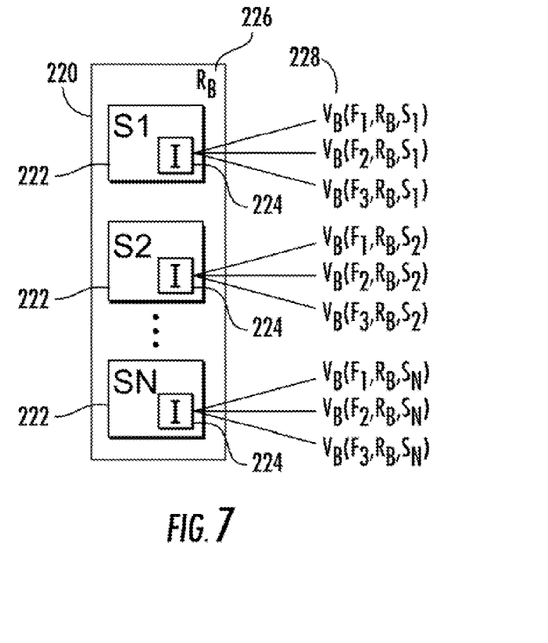
FIG. 7 is a schematic illustration of an example base sample set of images and associated values at a base resolution.

Once the base sample set 220 has been obtained, sensitivity module 62 (shown in FIG. 4) directs processing unit 50 to obtain base values 228 for each of a plurality of candidate features ($F_1$, $F_2$, $F_3$) of the image 224 at the base resolution $R_B$ for each sample 222 ($S_1$, $S_2$, ... $S_N$). Although FIG. 7 illustrates obtaining base values ($V_B$) 228 for three features, base values may alternatively be obtained for a greater or fewer of such features of image 224.

Figure 8:
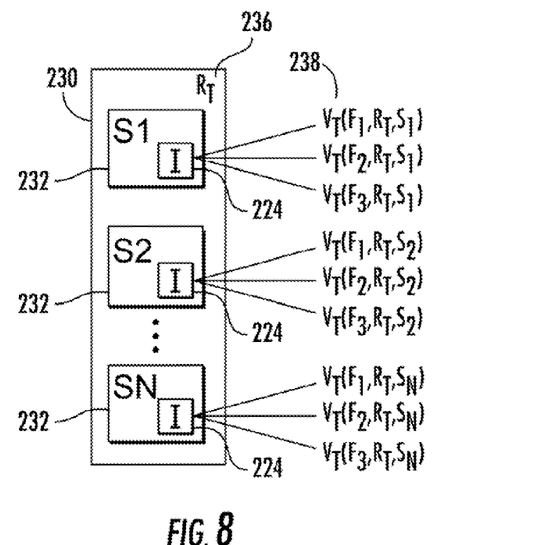
FIG. 8 is a schematic illustration of an example test sample set of images and associated values at a test resolution.

As indicated by step 204 and illustrated by FIG. 8, capture module 60 (shown in FIG. 4) directs processing unit 50 (shown in FIG. 1) to receive or obtain a test sample set 230 of samples 232 of the image 224 at a test resolution 236. The test resolution 236 is a particular resolution chosen for an electronic capture device of interest. In one example, the test resolution 236 may be the nominal or default resolution indicated by a manufacturer or retailer for the particular electronic capture device. The test resolution 236 is a resolution less than the base resolution 226.

Once the test sample set 230 has been obtained, sensitivity module 62 (shown in FIG. 4) directs processing unit 50 to obtain test values 238 for each of the plurality of candidate features ($F_1$, $F_2$, $F_3$) of the image 224 at the test resolution RT for each sample 232 ($S_1$, $S_2$, ... $S_N$). Although FIG. 8 illustrates obtaining test values (Vr) 238 for three features, test values may alternatively be obtained for a greater or fewer of such features of image 224.

Figure 9:
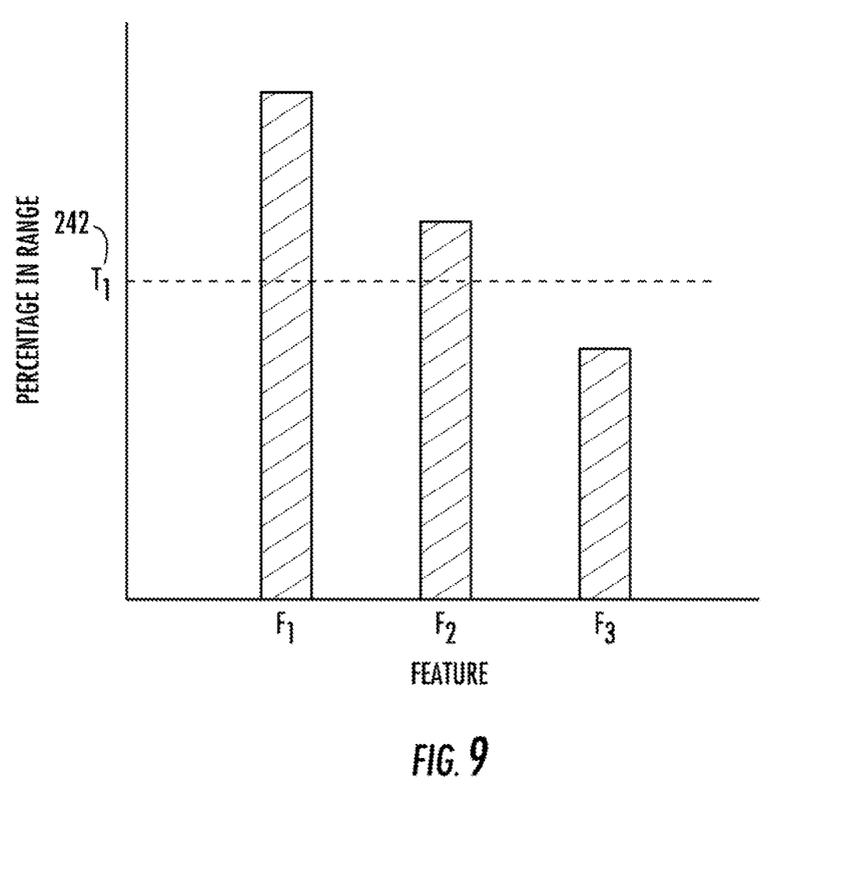
FIG. 9 is a graph illustrating one example of correlation between base sample values and test sample values.

As indicated by step 206, sensitivity module 62 directs processing unit 50 to determine a correlation value or score for the test values to base values for each feature ($F_1$-$F_N$). In other words, sensitivity module 62 determines how similar the values for a feature of an image captured at the test resolution are to those values for the same feature of the image captured at the higher base resolution. In one implementation, sensitivity module 62 utilizes a statistical value for the correlation score. In the example, sensitivity module 62 determines a range of base values for each feature. As shown in FIG. 9, sensitivity module 62 then determines what percentage of the test values for each feature fall within the range of the associated feature. As shown by FIG. 9, in the example scenario illustrated, feature $F_1$ has the largest percentage of test values falling within the corresponding range of base values for feature $F_1$. Feature $F_2$ as the second-largest percentage of test values falling within the corresponding range of base values for feature $F_2$. In other implementations, other mathematical or statistical correlations between the test values and the base values for a feature may be utilized.

As indicated by step 208, selection module 64 (shown in FIG. 4) directs processing unit 50 (shown in FIG. 1) to select a feature or a set of features for use in counterfeit determinations are counterfeit analysis when images 224 are captured and received by the particular electronic capture device. In one implementation, selection module 64 may utilize a predefined threshold 242 stored in memory 52 (shown in FIG. 1) for selecting the feature or sets of features. In the example illustrated in FIG. 9, features $F_1$ and $F_2$ are each selected for further consideration using with the particular electronic capture device as both features have correlation scores (percentages within the range) above threshold 242.

Figure 10:
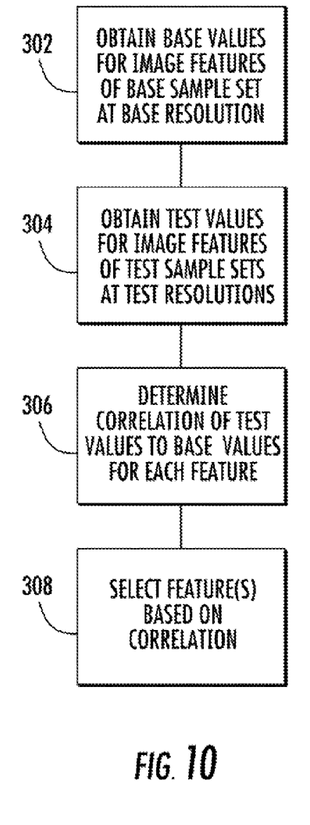
FIG. 10 is a flow diagram of another example method for selecting an image feature for counterfeit analysis based upon feature resolution sensitivity.

FIG. 10 illustrates an example method 300 that may be carried out by system 20 when determining what features of an image captured by a particular electronic capture device having a particular default or nominal resolution should be used for counterfeit analysis. Method 300 is similar to method 200 except that method 300 determines image feature sensitivity across a range of different test resolutions less than the base resolution. As indicated by step 302 and illustrated by FIG. 7, capture module 60 (shown in FIG. 4) directs processing unit 50 (shown in FIG. 1) to receive or obtain a base sample set 220 of samples 222 of an image 224 at a higher base resolution 226. Step 302 is identical to step 202 discussed above with respect to method 200.

Figure 11:
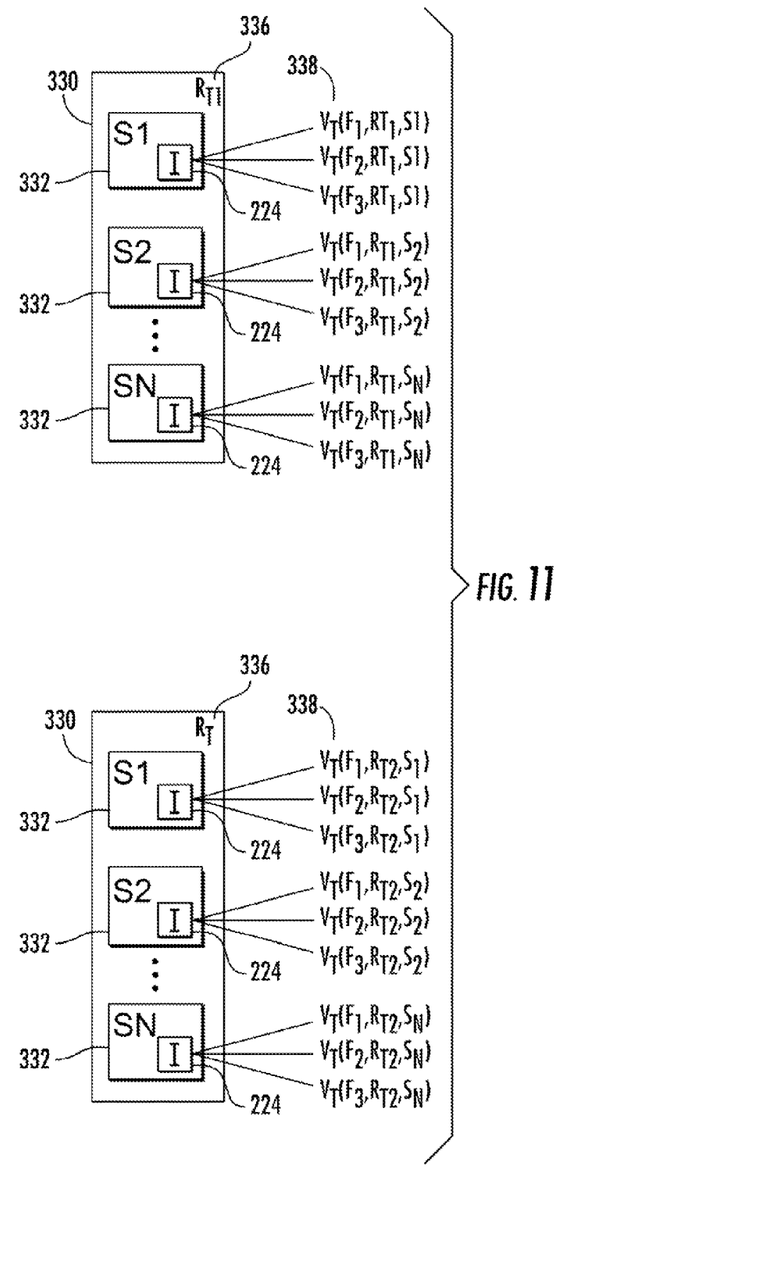
FIG. 11 is a schematic illustration of test sample sets and associated values at different test resolutions.

As indicated by step 304 and illustrated by FIG. 11, capture module 60 (shown in FIG. 4) directs processing unit 50 (shown in FIG. 1) to receive or obtain test sample sets 330 of test samples 332 covering a range of different test resolutions ($R_{T1}$, $R_{T2}$) 336. In one implementation, the range of different test resolutions 336 may encompass the nominal or default resolution indicated by a manufacturer or retailer for the particular electronic capture device of interest and may include resolutions below the nominal or default resolution by a predetermined variance or tolerance extent. For example, if a smart phone camera has an indicated nominal resolution of 300 pixels per inch or 300 dots per inch, method 300 may obtain values for a feature from an image at 300 pixels per inch as well as at other resolutions less than 300 pixels per inch, for example, at resolutions down to 250 pixels per inch. By obtaining values for test resolutions below the nominal resolution indicated for the particular electronic capture device of interest, method 300 may determine how a change in the actual resolution for the electronic capture device of interest due to sensor aging or other sources of variability may impact values for a particular feature and may impact the results of counterfeit analysis using the particular feature. As will be described hereafter, in some implementations, processing unit 50 may obtain test samples 330 of image 224 at a wider range of test resolutions 336 to facilitate feature selection for multiple different electronic devices and to identify feature and resolution combinations that produce the most reliable and accurate counterfeit determinations for the particular image 224. Although FIG. 11 illustrates obtaining test values (VT) 338 for three features, test values may alternatively be obtained for a greater or fewer of such features of image 224. Although FIG. 11 illustrates obtaining test values 338 for image 224 at two test resolutions 336, method 300 may obtain test values 338 for image 224 at more than two test resolutions.

As indicated by step 306, sensitivity module 62 directs processing unit 50 to determine a correlation value or score for the test values to base values for each feature ($F_1$-$F_N$) at each of the test resolutions 336. In other words, sensitivity module 62 determines how similar the values for a feature of an image captured at each test resolution are to those values for the same feature of the image captured at the higher base resolution. In one implementation, sensitivity module 62 utilizes a statistical value for the correlation score.

Figure 12:
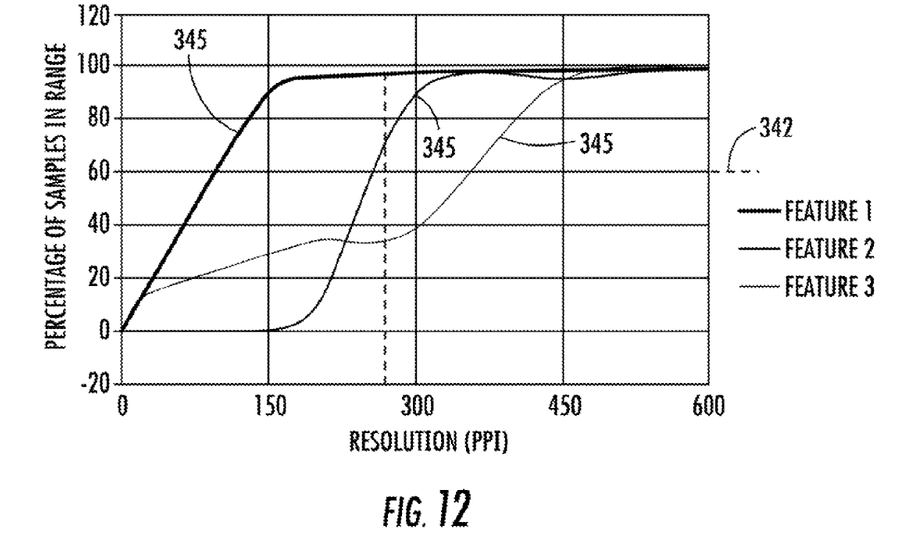
FIG. 12 is a graph illustrating another example of correlation between base sample values and values of test samples.

FIG. 12 illustrates an example scenario in which correlation scores have been determined and plotted. FIG. 12 illustrates the use of values for three features from multiple test sample sets at a wide range of different resolutions. In the example illustrated in FIG. 12, sensitivity module 62 determines the range of base values for each feature at the base resolution. Sensitivity module 62 then determines what percentage of the test values for each feature at each test resolution fall within the range of the associated feature.

As indicated by step 308, selection module 64 (shown in FIG. 4) directs processing unit 50 (shown in FIG. 1) to select a feature or a set of features for use in counterfeit determinations or counterfeit analysis when images 224 are captured and received by the particular electronic capture device. In one implementation, selection module 64 may utilize a predefined threshold 342 stored in memory 52 (shown in FIG. 1) for selecting the feature or sets of features. In addition to using threshold 342, method 300 may utilize other factors such as feature behavior in selecting a feature. The slope of each feature curve 345 indicates one behavior characteristic for the particular feature. In the example illustrated, those feature curves 345 having a steeper slope at a particular resolution indicate that the values for the feature may be more sensitive to a change in the resolution at that particular resolution. For example, in the example scenario illustrated by FIG. 12, at a resolution of 300 PPI, a small change in the actual resolution of the image containing feature 1 is less likely to affect the values for feature 1 as compared to how the values for feature 2 will be impacted by the same change in the resolution of the same image.

This behavior may be used by method 300 as an additional criteria when selecting features. For example, in the scenario illustrated by FIG. 12, the particular electronic capture device of interest has a nominal resolution of 260 PPI. In the example scenario, a candidate feature is initially deemed acceptable if at least 60% of the values for the feature at the nominal resolution of 260 PPI fall within the range of values for the feature at the base resolution as indicated by threshold 342. Even though both features 1 and 2 have correlation scores greater than threshold 342, feature 2 is much more sensitive to changes in the actual resolution as compared to feature 1 as represented by the larger slope of feature curve 345 for feature 2 at resolution 260 PPI as compared to resolution line 345 for feature 1 at resolution 260 PPI. As a result, in some implementations, feature 2 may not be selected in step 308 where the actual resolution of the particular electronic device may substantially vary due to such factors such as sensor aging and the like.

Figure 13:
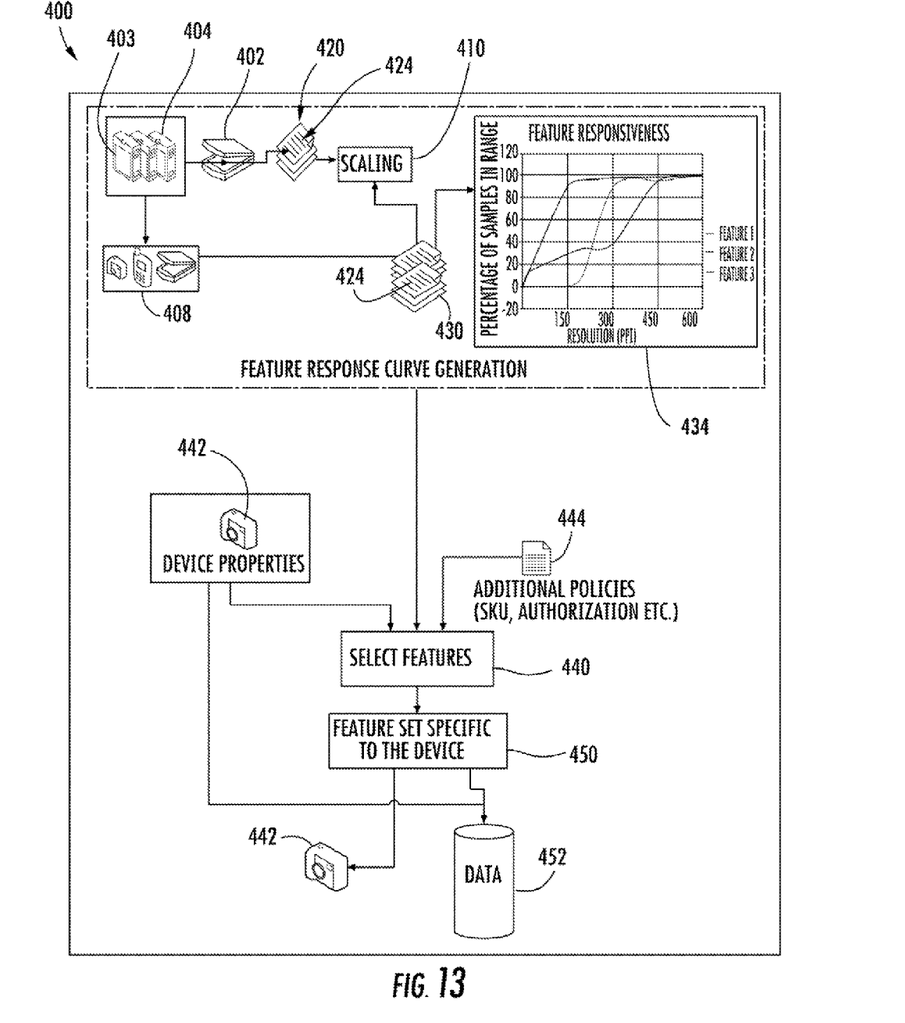
FIG. 13 is a diagram illustrating an example method for selecting an image feature for images acquired by a particular electronic capture device.

FIG. 13 is a diagram illustrating another example method 400 that may be employed by system 20 shown in FIG. 1 when carrying out the feature value sensitivity to image resolution described above in FIG. 5A with respect to step 152 and 154. As illustrated by FIG. 13, an electronic capture device 402 scans or digitally captures portions of samples 403 to generate a base sample set 420 of images 424 at a higher base resolution. As shown by FIG. 13, method 400 also comprises obtaining test sample sets 430 of images 424 at various test resolutions less than the base resolution of electronic capture device 402. In one implementation, the different test samples 430 of image 424 at the different test resolutions may be obtained by utilizing different electronic capture devices 408 having nominal resolutions less than the base resolution to capture different sample sets 330 at different test resolutions. As shown by FIG. 13, examples of such other electronic capture device 408 include digital cameras, cell or smart phone cameras or lower resolution scanners. Alternatively, or additionally, the different test samples 430 of image 424 at the different test resolutions may be obtained by processing unit 50 (shown in FIG. 1) applying scaling 410 to the output of image capture device 402. Sensitivity module 62 (shown in FIG. 4) then analyzes the base samples and the test samples to determine values for various features. Sensitivity module 62 uses such values to determine the sensitivity of such features to changes in resolution as indicated by graph 434 (the enlarged view of which is shown in FIG. 12).

Once feature resolution responsiveness or sensitivity has been determined, as indicated by block 440, selection module 64 (shown in FIG. 1) selects features for use with a particular electronic device 442 using properties of the particular device 442 (such as its nominal resolution), additional policies 444 and the determined sensitivity as represented by the feature resolution sensitivity curves of graph 434 for each of the features. For example, if the electronic capture device 442 comprises a 600 PPI scanner, all three features may be selected. If the electronic device 442 comprises a 300 PPI digital camera, features 1 and 2 may be available for use in counterfeit analysis. As noted above, in some circumstances, some features may be favored over others based upon stability. For purposes of this disclosure, the term "stability" refers to the range of resolutions at which the slope of the feature curve 345 is relatively flat. For example, in one implementation, a feature curve may be deemed to evidence stability if the change in the slope over a range is less than the relative change in the base of the range . . . say 20% change in slope over 30% range, from 210 PPI to 300 PPI for example. In other implementations, a feature may be selected over other features based upon the range of resolutions supported by the feature. For example, in the example illustrated, feature 1 may be selected over feature 3 because feature 1 supports a larger resolution range (120 to 600 PPI) as compared to feature 3 (260 to 600 PPI).

Examples of other criteria or policies 444 that may be used to trim or otherwise select features for use by the particular electronic device 442 include, but are not limited to, authorization, stock keeping unit (SKU), identity, company and the like. For example, in a mass-market SKU where fading damage the packaging may be expected, method 300 may give priority to features that are based on structure rather than color. For high-value items where brand identity markings are tightly controlled and available, image features tied to those markings may be favored. In situations where lighting conditions may vary considerably, color-based image features such as intensity or saturation-based image features may be given a lower priority. For images that include numerous and well-defined layout elements (layout intense images), structural features may be given a higher preference in the selection of features for counterfeit analysis.

In the implementation described, the selection of features in step 440 is being carried out pursuant to method 150 shown and described above with respect to FIG. 5A. In particular, feature value sensitivity to changes in resolution as indicated by graph 434 may be utilized to initially pre-filter or narrow down a list of candidate features prior to carrying out CIPA sensitivity evaluations to identify a final set of features. In other implementations, the selection of features in step 440 may alternatively be carried out pursuant to method 100 shown and described above with respect to FIG. 5, wherein such pre-filtering is omitted.

As indicated by block 450, once a particular feature or a particular set of features has been selected in step or block 440, the selected feature or set of features is assigned to the acquisition device or capture electronic device 442. In one implementation, the feature or feature set may be stored in the electronic capture device 442 itself. Alternatively, or additionally, the feature or feature set may be stored in a secure database 452 which may be accessed, in a wired or wireless fashion using a network or the Internet, upon authentication of device 442. In implementations where counterfeit determinations are carried out by processing unit 50 or server remote from device 442, the transmission of images from device 442 to the server or processing unit 50 may be carried out with encryption, wherein the processing unit 50 or server accesses database 452 to utilize the most appropriate features from the received images for counterfeit analysis.

Figure 14:
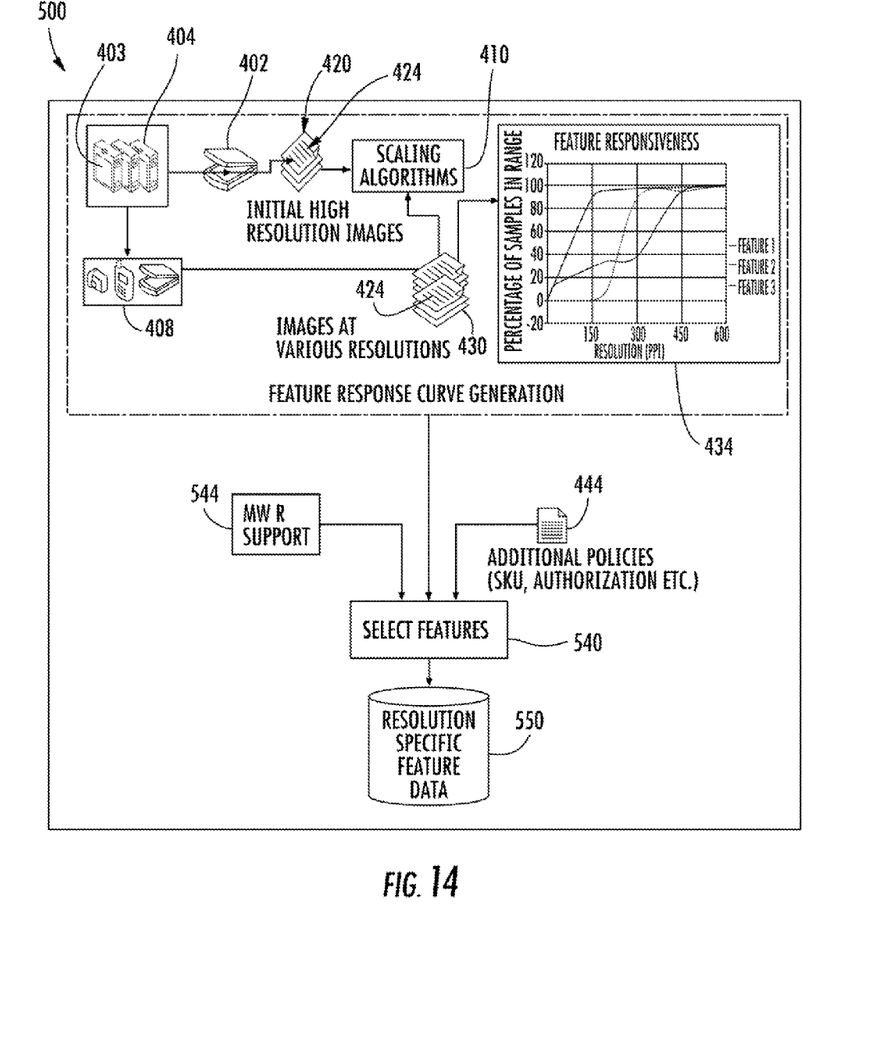
FIG. 14 is a diagram illustrating an example method for selecting an image feature for supporting a range of image resolutions.

FIG. 14 is a diagram illustrating another example method 500 that may be carried out by system 20 shown in FIG. 1. Method 500 is similar to method 400, shown in FIG. 13, except that instead of selecting an image feature or a set of image features for use when an image is captured by a particular acquisition device or electronic capture device, method 500 determines a feature set for supporting a range of resolutions or for at least supporting a predefined minimum resolution.

As indicated by block 540, selection module 64 (shown in FIG. 1) selects features for use with a particular electronic device 442 using additional policies 444, the input minimum resolution support 544 and the determined sensitivity as represented by the feature resolution sensitivity curves of graph 434 for each of the features. For example, if the minimum resolution 544 to be supported is 600 PPI, all three features may be selected. If the minimum resolution 544 to be supported is 300 PPI, features 1 and 2 may be selected for use in counterfeit analysis.

As noted above, in some circumstances, some features may be favored over others based upon stability. In other implementations, a feature may be selected over other features based upon the range of resolutions supported by the feature. In yet other implementations, the additional policies 444 may be used in the selection of a feature features for supporting the minimum resolution 544.

In the implementation described, the selection of features in step 440 is to be carried out pursuant to method 150 shown and described above with respect to FIG. 5A. In particular, feature value sensitivity to changes in resolution as indicated by graph 434 may be utilized to initially pre-filter or narrow down a list of candidate features prior to carrying out CIPA sensitivity evaluations to identify a final set of features. In other implementations, the selection of features in step 440 may alternatively be carried out pursuant to method 100 shown and described above with respect to FIG. 5, wherein such pre-filtering is omitted.

Upon selection of the feature or set of features that facilitate the support of a range of resolutions starting at a minimum resolution, the selected features are stored in a database 550. This broad feature set is utilized for counterfeit analysis for all sample images ever captured in the supported range of resolutions. In another implementation, different sample sets may be selected for different subsets or sub ranges of resolutions. For example, a first set of features may be selected and stored for a range of resolutions from 100 PPI to 200 PPI, a second set of features may be selected and stored for a range of resolutions from 201 PPI to 300 PPI, a third set of features may be selected in the stored for a range of resolutions from 301 PPI to 400 PPI and so on.

Although the present disclosure has been described with reference to example examples, workers skilled in the art will recognize that changes may be made in form and detail without departing from the spirit and scope of the claimed subject matter. For example, although different examples may have been described as including features providing benefits, it is contemplated that the described features may be interchanged with one another or alternatively be combined with one another in the described examples or in other alternative examples. Because the technology of the present disclosure is relatively complex, not all changes in the technology are foreseeable. The present disclosure described with reference to the examples and set forth in the following claims is manifestly intended to be as broad as possible. For example, unless

What is claimed is:

1. A computer-implemented method comprising:
   determining a first counterfeit identification performance attribute (CIPA) sensitivity to changes in resolution of an image for a first feature of the image;
   determine a second CIPA sensitivity to changes in resolution of an image for a second feature of the image;
   select the first feature based on a comparison of the first CIPA to the second CIPA; and
   determining whether the image on a sample is a counterfeit based on the selected first feature.

2. The method of claim 1, wherein the first CIPA sensitivity represents a CIPA sensitivity for a first set of features including the first feature and least one other feature and wherein the second CIPA sensitivity includes a CIPA sensitivity for a second set of features including the second feature and at least one other feature.

3. The method of claim 2, wherein selecting the first feature based on a comparison of the first CIPA to the second CIPA comprises comparing the first CIPA to the second CIPA at a resolution that satisfies a predefined threshold.

4. The method of claim 3, wherein determining the first CIPA sensitivity comprises determining a first CIPA for the first set of features at each of a plurality of resolutions, wherein the resolution is a lowest resolution at which the first CIPA satisfies the predefined threshold.

5. The method of claim 1, wherein first feature comprises at least one of: R (red) channel, G (green) channel, B (blue) Channel, Cyan, C=(G+B−R+255)/3 channel, Magenta, M=(R+B−G=255/3 channel, Yellow, Y=(R+G−B+255)/3 channel, Hue, Saturation=max (RGB)*(1−min(RCB)/sum (RGB)), Intensity=(R+G+B)/3 and pixel variance ("edge space"), a histogram metric and a projection profile metric.

6. The method of claim 1, wherein the CIPA attribute comprises at least one of: counterfeit identification accuracy, clustering accuracy and clustering behavior.

7. The method of claim 1 further comprising pre-filtering candidate features of the image to exclude a third feature based upon a sensitivity of values for the third feature to changes in resolution of an image.

8. The method of claim 1, wherein the resolution of the image on a sample is a resolution at which a CIPA sensitivity for the first feature satisfies a predefined threshold.

9. The method of claim 8, wherein determining the first CIPA sensitivity and determining the second CIPA sensitivity is by determining a CIPA for each of the first feature and the second feature at each of a plurality of resolutions and wherein the resolution is a lowest resolution at which the CIPA for the first feature that satisfies the predefined threshold.

10. A machine-readable non-transitory storage medium comprising instructions executable by a processor to:
    determine counterfeit identification performance attribute (CIPA) sensitivity to changes in resolution of an image for a first feature of the image;
    determine counterfeit identification performance attribute (CIPA) sensitivity to changes in resolution of the image for a second feature of the image;
    select the first feature based on a comparison of the first CIPA sensitivity to the second CIPA sensitivity; and
    determine whether the image on a sample is a counterfeit using the selected first feature.

11. The machine-readable non-transitory storage medium of claim 10, further comprising instructions to determine a minimum resolution for use with the first feature of the image when determining whether the image on the sample is a counterfeit.

12. The machine-readable non-transitory storage medium of claim 10, further comprising instructions to determine a list of features for use with the first feature of the image when determining whether the image on the sample is a counterfeit.

13. The machine-readable non-transitory storage medium of claim 11, wherein the CIPA attribute comprises at least one of: counterfeit identification accuracy, clustering accuracy and clustering behavior.

14. The machine-readable non-transitory storage medium of claim 11, wherein selecting the first feature comprises selecting the first feature for a particular range of image resolutions.

15. An apparatus comprising:
    a processor; and
    a computer readable non-transitory storage medium comprising instructions to:
        determine a first counterfeit identification performance attribute (CIPA) sensitivity to changes in resolution of for a first image feature of an image;
        determine a second CIPA sensitivity to changes in resolution of a second image feature of the image an image;
        select the first image feature based on a comparison of the first CIPA sensitivity to the second CIPA sensitivity; and
        determine whether the image on a sample is a counterfeit using the selected first feature.

16. The apparatus of claim 15, wherein the resolution of the image on the sample is a resolution at which a CIPA sensitivity for the first feature satisfies a predefined threshold.

17. The apparatus of claim 15, wherein the resolution of the image on the sample is a resolution associated with capture by a particular type of device.

18. The apparatus of claim 15, wherein determining the first CIPA sensitivity and determining the second CIPA sensitivity is by determining a CIPA for each of the first feature and the second feature at each of a plurality of resolutions and wherein the resolution of the image on the sample is a lowest resolution at which the CIPA for the first feature that satisfies the predefined threshold.

19. The apparatus of claim 15, wherein the CIPA attribute comprises at least one of: counterfeit identification accuracy, clustering accuracy and clustering behavior.

20. The apparatus of claim 15, further comprising instructions to determine a list of features for use with the first image feature when determining whether the image on the sample is a counterfeit.

* * * * *